US012593044B2

(12) United States Patent
Li et al.

(10) Patent No.: US 12,593,044 B2
(45) Date of Patent: Mar. 31, 2026

(54) DEEP CONTEXTUAL VIDEO IMAGE COMPRESSION

(71) Applicant: Microsoft Technology Licensing, LLC, Redmond, WA (US)

(72) Inventors: Jiahao Li, Redmond, WA (US); Bin Li, Hefei (CN); Yan Lu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/562,793

(22) PCT Filed: May 23, 2022

(86) PCT No.: PCT/US2022/030462
§ 371 (c)(1),
(2) Date: Nov. 20, 2023

(87) PCT Pub. No.: WO2023/278068
PCT Pub. Date: Jan. 5, 2023

(65) Prior Publication Data
US 2024/0251083 A1      Jul. 25, 2024

(30) Foreign Application Priority Data

Jun. 30, 2021    (CN) ......................... 202110738324.5

(51) Int. Cl.
*H04N 19/13*          (2014.01)
*H04N 19/137*        (2014.01)
*H04N 19/91*          (2014.01)
(52) U.S. Cl.
CPC ........... *H04N 19/13* (2014.11); *H04N 19/137* (2014.11); *H04N 19/91* (2014.11)
(58) Field of Classification Search
CPC ...... H04N 19/13; H04N 19/137; H04N 19/91; H04N 19/103; H04N 19/136;
(Continued)

(56) References Cited

U.S. PATENT DOCUMENTS 10,546,233 B1 * 1/2020 Bhattacharyya ....... G06N 3/063
2012/0236929 A1 * 9/2012 Liu ........................ H04N 19/46
375/E7.126
(Continued)

FOREIGN PATENT DOCUMENTS

CN        102792688 A      11/2012
CN        103733622 A        4/2014
CN        112866694 A  *   5/2021   .............. G06N 3/04

OTHER PUBLICATIONS

Woonsung Park et al., (hereinafter Park) "Deep Predictive Video Compression Using Mode-Selective Uni- and Bi-Directional Predictions Based on Multi-Frame Hypothesis", In Proceedings of IEEE Access, vol. 9, Dec. 21, 2020, pp. 72-85 (Year: 2020).*
(Continued)

*Primary Examiner* — Dramos Kalapodas
(74) *Attorney, Agent, or Firm* — Schwegman Lundberg & Woessner, P.A.

(57)        ABSTRACT

According to implementations of the present disclosure, there is provided a context-based image coding solution. According to the solution, a reference image of a target image is obtained. A contextual feature representation is extracted from the reference image, the contextual feature representation characterizing contextual information associated with the target image. Conditional encoding or conditional decoding is performed on the target image based on the contextual feature representation. In this way, the enhancement of the performance is achieved in terms of the reconstruction quality and the compression efficiency.

20 Claims, 8 Drawing Sheets

(58) Field of Classification Search
CPC .... H04N 19/172; H04N 19/132; H04N 19/30;
H04N 19/85; H04N 19/105; H04N
19/139; G06N 3/0464; G06N 3/08; G06N
3/045; G06T 13/40; G06T 7/73
See application file for complete search history.

(56) References Cited

U.S. PATENT DOCUMENTS

| | | |
|---|---|---|
| 2019/0052883 A1 | 2/2019 | Ikeda |
| 2020/0107023 A1 | 4/2020 | Lee |
| 2020/0327701 A1 | 10/2020 | Zhou |
| 2021/0110306 A1* | 4/2021 | Krishnan ............... G06N 3/094 |
| 2021/0152831 A1 | 5/2021 | Liu et al. |
| 2022/0394240 A1* | 12/2022 | Zhang .................. H04N 19/593 |

OTHER PUBLICATIONS

Dong Liu et al., "Deep Learning-Based Video Coding: A Review and a Case Study", CAS Key Laboratory of Technology in Geo-Spatial Information Processing, University of Science and Technology of China, Feb. 6, 2020 (Year: 2020).*

Theo Ladune et al., : "Conditional Coding for Flexible Learned Video Compression", ICLR, srXiv:2104.07930v3, Apr. 28, 2021 (Year: 2021).*

International Search Report and Written Opinion received for PCT Application No. PCT/US22/030462, Sep. 20, 2022, 8 pages.

Ladune, et al., "Conditional Coding for Flexible Learned Video Compression", arXiv:2104.07930v3, Apr. 28, 2021, 18 pages.

Li, et al., "Deep Contextual Video Compression", arXiv:2109.15047v2, Dec. 14, 2021, 19 pages.

Park et al., "Deep Predictive Video Compression Using Mode-Selective Uni- and Bi-Directional Predictions Based on Multi-Frame Hypothesis", In Proceedings of IEEE Access, vol. 9, Dec. 21, 2020, pp. 72-85.

Sun, et al., "Spatiotemporal Entropy Model is All You Need for Learned Video Compression", arXiv:2104.06083v1, Apr. 13, 2021, 18 pages.

First Office Action Received for Chinese Application No. 202110738324.5, mailed on Jan. 26, 2025, 18 pages. (English Translation Provided).

"FFmpeg", accessed on link https://www.ffmpeg.org/, retrieved on Jul. 30, 2024, 34 pages.

"PyTorch Video Compression", accessed on link https://github.com/ZhihaoHu/PyTorchVideoCompression, retrieved on Jul. 30, 2024, 4 pages.

"Tutorial: Learned image and video compression with deep neural networks", accessedon link https://drive.google.com/file/d/162omgk0CmHPBj4J7vWsNr8N9SPn5j97F/view, retrieved on Apr. 12, 2021, 60 pages.

"Ultra video group test sequences", accessed on link https://ultravideo.fi/, retrieved on Apr. 12, 2021, 5 pages.

Agustsson, et al., "Scale-space flow for end-to-end optimized video compression", In Proceedings of the IEEE/CVF Conference on Computer Vision and Pattern Recognition, 2020, pp. 8503-8512.

Balle, et al., "End-to-end optimized image compression", arXiv:1611.01704, Mar. 3, 2017, 27 pages.

Balle, et al., "Variational image compression with a scale hyperprior", arXiv:1802.01436, May 1, 2018, 23 pages.

Begaint, et al., "Compressai: a pytorch library and evaluation platform for end-to-end compression research", arXiv:2011.03029, Nov. 5, 2020, 19 pages.

Bjontegaard, Gisle., "Calculation of average psnr differences between rd-curves", VCEG-M33, 2001, 4 pages.

Bossen, Frank., "Common test conditions and software reference configurations", In CTVC-L1100, vol. 12.2013, 12 pages.

Bross, et al., "Developments in international video coding standardization after avc, with an overview of versatile video coding (vvc)", Proceedings of the IEEE, vol. 109, Issue No. 9, Sep. 2021, pp. 1463-1493.

Cheng, et al., "Learned Image Compression with Discretized Gaussian Mixture Likelihoods and Attention Modules", In Proceedings of the IEEE/CVF Conference on Computer Vision and Pattern Recognition, 2020, pp. 7939-7948.

Djelouah, et al., "Neural inter-frame compression for video coding", In Proceedings of the IEEE/CVF International Conference on Computer Vision (ICCV), Oct. 2019, pp. 6420-6428.

Francois, et al., "VVC per-tool performance evaluation compared to HEVC", accessed on link https://www.ibc.org/download?ac=14216, 2020, 14 pages.

Girod, et al., "Comparison of the H.263 and H.261 Video Compression Standards", In Standards and Common Interfaces for Video Information Systems: A Critical Review, 1995, 19 pages.

Habibian, et al., "Video compression with rate-distortion autoencoders", In Proceedings of the IEEE/CVF International Conference on Computer Vision, 2019, pp. 7033-7042.

Hu, et al., "Improving deep video compression by resolution adaptive flow coding", arXiv:2009.059, Sep. 13, 2020, 20 pages.

Johnston, et al., "Improved lossy image compression with priming and spatially adaptive bit rates for recurrent networks,", In Proceedings of the IEEE Conference on Computer Vision and Pattern Recognition, 2018, pp. 4385-4393.

Ladune, et al., "Optical Flow and Mode Selection for Learning-based Video Coding", In IEEE 22nd International Workshop on Multimedia Signal Processing, 2020, 6 pages.

Lin, et al., "M-lvc: multiple frames prediction for learned video compression", In Proceedings of the IEEE/CVF Conference on Computer Vision and Pattern Recognition, 2020, pp. 3546-3554.

Liu, et al., "Conditional entropy coding for efficient video compression", arXiv:2008.09180, Aug. 20, 2020, 23 pages.

Lu, et al., "An end-to-end learning framework for video compression", IEEE transactions on pattern analysis and machine intelligence, 2020, vol. 14, Issue No. 8, Apr. 20, 2020, 18 pages.

Lu, et al., "Dvc: An end-to-end deep video compression framework", In Proceedings of the IEEE/CVF Conference on Computer Vision and Pattern Recognition, 2019, pp. 11006-11015.

Lu, et al., Content adaptive and error propagation aware deep video compression, In European Conference on Computer Vision, 2020, pp. 456-472.

Minnen, et al., "Joint autoregressive and hierarchical priors for learned image compression", arXiv:1809.02736, Sep. 8, 2018, 22 pages.

Pessoa, et al., "End-to-End Learning of Video Compression Using Spatio-Temporal Autoencoders", In IEEE Workshop on Signal Processing Systems, 2020, 6 pages.

Ranjan, et al., "Optical Flow Estimation using a Spatial Pyramid Network", In Proceedings of the IEEE conference on computer vision and pattern recognition, 2017, pp. 2720-2729.

Shannon, C., "A mathematical theory of communication", ACM Sigmobile mobile computing and communications review, vol. 5, Issue No. 1, 2001, pp. 3-55.

Sullivan, et al., "Overview of the high efficiency video coding (hevc) standard", In IEEE Transactions on circuits and systems for video technology, vol. 22, Issue No. 12, 2012, pp. 1649-1668 (Dec. 2012).

Theis, et al., "Lossy image compression with compressive autoencoders", arXiv:1703.00395, Mar. 1, 2017, 19 pages.

Toderici, et al., "Full Resolution Image Compression with Recurrent Neural Networks", In Proceedings of the IEEE Conference on Computer Vision and Pattern Recognition, 2017, pp. 5306-5314.

Toderici, et al., "Variable rate image compression with recurrent neural networks", arXiv:1511.06085, Nov. 21, 2015, 9 pages.

Wang, et al., "Mcl-jcv: a jnd-based h. 264/avc video quality assessment dataset", In IEEE International Conference on Image Processing (ICIP), 2016, pp. 1509-1513.

Wu, et al., "Video compression through image interpolation", In ECCV, 2018, 16 pages.

Xu, et al., "Learned image and video compression with deep neural networks", In IEEE International Conference on Visual Communications and Image Processing, 2020, 3 pages.

Xue, et al., "Video enhancement with task-oriented flow", International Journal of Computer Vision, vol. 127, Issue No. 8, 2019, 20 pages.

(56)    References Cited

OTHER PUBLICATIONS

Yang, et al., "Learning for video compression with hierarchical quality and recurrent enhancement", In Proceedings of the IEEE/ CVF Conference on Computer Vision and Pattern Recognition, Jun. 2020, pp. 6627-6636.

Second Office Action Received for Chinese Application No. 202110738324.5, mailed on Jun. 28, 2025, 12 pages. (English Translation Provided).

Rejection Decision Received for Chinese Application No. 202110738324.5, mailed on Sep. 30, 2025, 12 pages. (English Translation Provided).

Notice of Reasons for Refusal Received for Japanese Application No. 2023-570174, mailed on Jan. 5, 2026, 13 pages. (English Translation Provided).

\* cited by examiner

100

200

700

710

OBTAIN A REFERENCE IMAGE OF A TARGET IMAGE

720

EXTRACT A CONTEXTUAL FEATURE
REPRESENTATION FROM THE REFERENCE IMAGE

730

PERFORM CONDITIONAL ENCODING OR
CONDITIONAL DECODING ON THE TARGET IMAGE
BASED ON THE CONTEXTUAL FEATURE
REPRESENTATION

800 ⌐

DEEP CONTEXTUAL VIDEO IMAGE COMPRESSION

CLAIM OF PRIORITY

This application is a U.S. National Stage Filing under 35 U.S.C. 371 of International Patent Application Serial No. PCT/US2022/030462, filed May 23, 2022, and published as WO 2023/278068 A1 on Jan. 5, 2023, which claims the benefit of priority to Chinese Patent Application No. 202110738324.5, filed Jun. 30, 2021, which applications and publication are incorporated herein by reference in their entirety.

BACKGROUND

In this document, "coding" may include encoding and/or decoding. Usually, a frame of a video is encoded by an encoder at a transmitting terminal to compress the frame of the video for transmission over a network. The encoding of a given frame may be performed by referring to another frame in a reference video. A bitstream corresponding to an encoded representation generated through the encoding is transmitted to a receiving terminal. A corresponding decoder at the receiving terminal may decode the given frame of the video from the received bitstream, so as to output the decoded given frame to a screen of the receiving terminal. During the coding, the reconstruction quality and the compression efficiency of the frame are always an aspect which is noteworthy.

SUMMARY

According to implementations of the present disclosure, there is provided a context-based image coding solution. In the solution, a reference image of a target image is obtained. A contextual feature representation is extracted from the reference image, the contextual feature representation characterizing contextual information associated with the target image. Conditional encoding or conditional decoding is performed on the target image based on the contextual feature representation. In this way, the enhancement of the performance is achieved in terms of the reconstruction quality and the compression efficiency.

The Summary is to introduce a selection of concepts in a simplified form that are further described below in the Detailed Description. The Summary is not intended to identify key features or essential features of the subject matter described herein, nor is it intended to be used to limit the scope of the subject matter described herein.

BRIEF DESCRIPTION OF THE DRAWINGS

Throughout the drawings, the same or similar reference symbols refer to the same or similar elements.

DETAILED DESCRIPTION OF EMBODIMENTS

Figure 1:
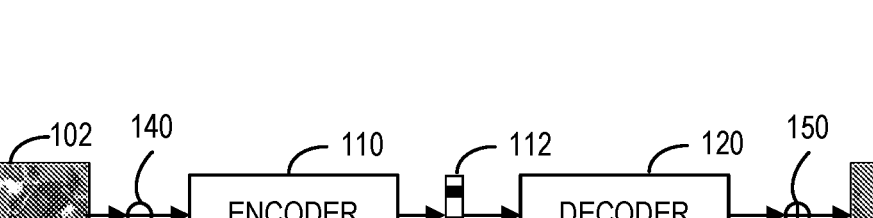
FIG. 1 illustrates a schematic block diagram of a conventional residual-based video coding system.

The present disclosure will now be described with reference to some example implementations. It is to be understood that these implementations are described only for the purpose of illustration and help those skilled in the art to better understand and thus implement the present disclosure, without suggesting any limitations to the scope of the present disclosure.

As used herein, the term "includes" and its variants are to be read as open terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

As used herein, the term "model" may refer to an association between corresponding input and output learnable from the training data, and thus a corresponding output may be generated for a given input after the training. The generation of the model may be based on machine learning techniques. Deep learning is one of machine learning algorithms that processes the input and provides the corresponding output using a plurality of layers of processing units. A neural network model is an example of a deep learning-based model. As used herein, "model" may also be referred to as "machine learning model", "learning model", "machine learning network" or "learning network", which terms are used interchangeably herein.

A "neural network" is a machine learning network based on deep learning. The neural network can process an input to provide a corresponding output, and usually includes an input layer, an output layer, and one or more hidden layers between the input layer and the output layer. The neural network used in deep learning applications usually includes a large number of hidden layers, thereby increasing the depth of the network. The layers of the neural network are connected in order, so that the output of a preceding layer is provided as the input of a next layer, where the input layer receives the input of the neural network, and the output of the output layer is regarded as a final output of the neural network. Each layer of the neural network includes one or more nodes (also referred to as processing nodes or neurons), each of which processes input from the preceding layer.

Generally, machine learning may include three phases, i.e., a training phase, a test phase, and an application phase (also referred to as an interference phase). In the training phase, a given model may be trained by using a great amount of training data, with parameter values being iteratively updated until the model can obtain, from the training data, consistent interference that meets an expected target. Through the training, the model may be considered as being capable of learning the association between input and the output (also referred to as input-to-output mapping) from the training data. The parameter values of the trained model are determined. In the test phase, a test input is applied to the trained model to test whether the model can provide a correct output, so as to determine the performance of the model. In the application phase, the model may be used to process an actual input based on the parameter values obtained in the training and to determine the corresponding output.

In this document, a "frame" or "video frame" refers to individual images in a video segment. "Image" and "frame" are used interchangeably in this document. A plurality of consecutive images may form a dynamic video segment, where each image is considered as a frame.

Currently, with the development of the machine learning technology, it has been proposed to apply machine learning to a video coding process. However, the reconstruction quality and compression efficiency of video frames still need to be improved due to limitations of the conventional coding process.

Residual-Based Conventional Video Coding

Conventional video coding solutions, including the H.261 video coding standard developed in 1988 to the H.266 video coding standard released in 2020, all widely employ a residual-based coding solution. The solution is based on a predictive coding paradigm by generating a reference image of the current image, and performing encoding and decoding on a residual between the current image and the reference image. FIG. 1 shows a schematic block diagram of a conventional residual-based video coding system 100. The system 100 includes an encoder 110, a decoder 120, an image predictor 130, a residual generation module 140 and a residual addition module 150. In the residual-based coding process, the encoder 110 is referred to as a residual encoder, and the decoder 120 is referred to as a residual decoder.

Assuming that an image 102 to be encoded currently is an image $x_t$ at time t in a video segment, the image predictor 130 is configured to generate a predicted image $\tilde{x}_t$ 132 for the image 102 based on the reference image 170. The reference image 170 may include a decoded image $\hat{x}_{t-1}$ at time t−1 before t in the video segment. The residual generation module 140 calculates the residual between the image 102 $x_t$ and the predicted image $\tilde{x}_t$ 132. The encoder 110 encodes the residual to generate an encoded representation of the image 102 $x_t$. A bitstream 112 corresponding to the encoded representation is transmitted to the decoding side.

On the decoding side, the decoder 120 receives the bitstream 112, and decodes the bitstream 112 to get an decoded image. The residual addition module 150 adds up the decoded image provided by the decoder 120 and the predicted image $\tilde{x}_t$ 132 generated by the image predictor 130 to obtain the decoded image 160 $\hat{x}_t$ at time t.

The residual-based video coding may be represented as follows:

$$\hat{x}_t = f_{dec}(\lfloor f_{enc}(x_t - \tilde{x}_t) \rceil) + \tilde{x}_t \qquad (1)$$

$$\text{where } \tilde{x}_t = f_{predict}(\hat{x}_{t-1})$$

In the above Equation (1), $f_{enc}(\bullet)$ represents an encoding process of the encoder 110, $f_{dec}(\bullet)$ represents a decoding process of the decoder 120, $f_{predict}(\bullet)$, represents a prediction process of the image predictor 130, and $\lfloor \bullet \rceil$ represents a quantization operation. In an application based on machine learning, the encoder 110 may use a machine learning model to implement residual encoding, and accordingly, the decoder 120 may use the machine learning model to implement residual decoding.

Working Principle and Example System

Considering the strong temporal correlation between frames in a video, residual encoding was considered as a simple and effective way of compressing the video in the past. However, the Inventor of the present application discovers through research that the residual coding by encoding the current image $x_t$ with the predicted image $\hat{x}_t$ being given is not optimal because the residual coding always removes redundancy between the images by using a simple subtraction operation. An entropy of the residual coding is greater than or equal to an entropy of the conditional coding $H(x_t - \tilde{x}_t) \geq H(x_t | \tilde{x}_t)$, where H is a Shannon entropy. Theoretically, a pixel of the current image $x_t$ is related to all pixels in the decoded image at a previous time, and these pixels have been decoded in the image $x_t$. For a traditional codec, it is difficult to explicitly characterize all the correlations between the decoded image at the previous time and the current image by handcrafted rules. Therefore, the residual-based coding makes use of an assumption that the pixels of the current image are only related to corresponding predicted pixels in the predicted image, thereby simplifying the coding process. However, such a coding solution is indeed not sufficiently optimized in terms of reconstruction quality and compression rate.

According to example implementations of the present disclosure, there is provided a context-based coding solution. Different from generating a predicted image of the target image and performing encoding on the residual between the target image and the predicted image as required in the conventional solution, conditional coding is performed on the target image by extracting contextual feature representation from the reference image in the example implementations of the present disclosure. In this solution, in the feature domain, the contextual information is taken as a condition to guide adaptive encoding on the target image. Such a solution can obtain a higher compression rate in the case of the same bit rate. In addition, since the contextual information in various aspects related to the current image can be characterized in a higher dimension in the feature domain, the context-based image coding can achieve higher reconstruction quality. In this way, performance improvements are achieved in terms of reconstruction quality and compression efficiency.

Hereinafter, some example implementations of the present disclosure will be described in more detail with reference to the accompanying drawings.

Figure 2:
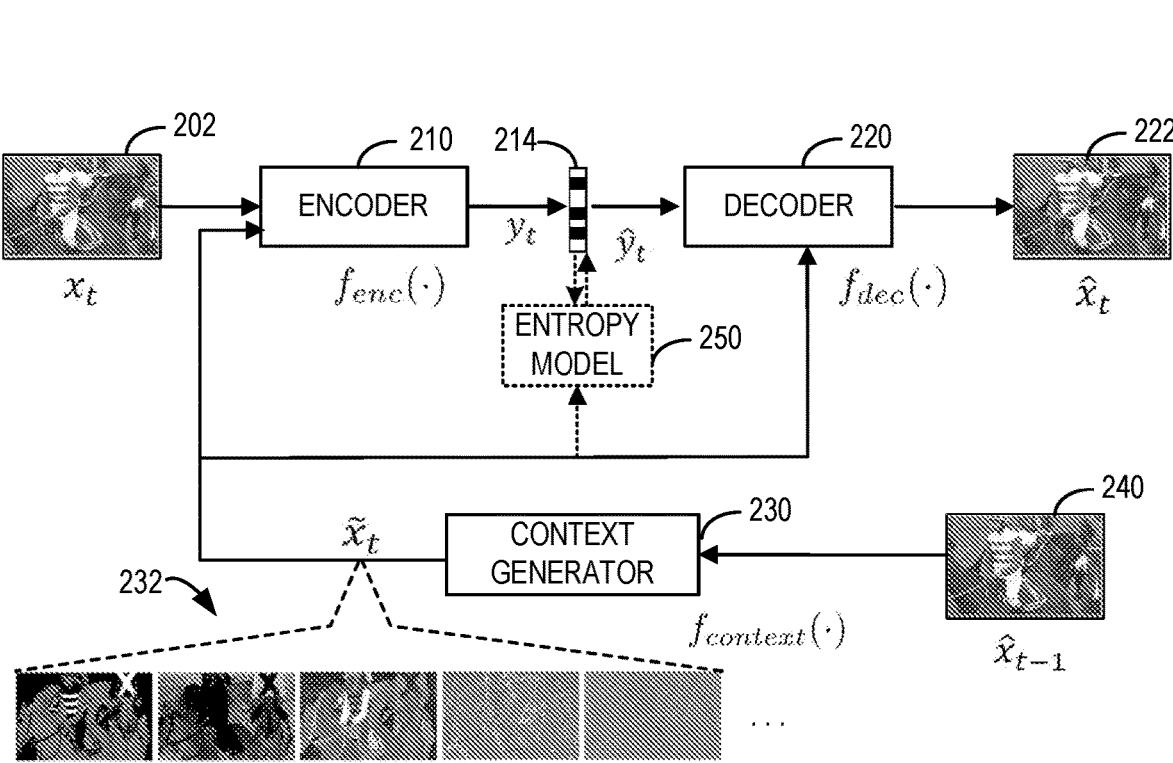
FIG. 2 illustrates a schematic block diagram of a context-based video coding system according to some implementations of the present disclosure.

Reference is first made to FIG. 2, which illustrates a schematic block diagram of a context-based video coding system 200 according to some implementations of the present disclosure. The system 200 includes an encoder 210, a decoder 220 and a context generator 230.

The encoder 210 is configured to generate an encoded representation $y_t$, also referred to as a latent code, of an image $x_t$ 202 to be encoded (referred to as a target image in this document). The target image $x_t$ 202 may include a frame in the video segment at time t. In some implementations, the system 200 may further include an entropy model 250, which is configured to perform entropy encoding (on an encoding side) or entropy decoding (on a decoding side). On the encoding side, the entropy model 250 quantizes the encoded representation $y_t$ to obtain a quantized encoded representation $\hat{y}_t$, and determines a bitstream 214 of the target image 202 from the quantized encoded representation $\hat{t}_t$.

On the decoding side, the bitstream 214 corresponding to the target image 202 may be received, and the quantized encoded representation $\hat{y}_t$ may be generated from the bitstream 214. The decoder 220 is configured to generate a decoded image $\hat{x}_t$ 222 corresponding to the target image $x_t$ 202. The decoder 220 may decode the quantized encoded representation $\hat{y}_t$ to determine the decoded image 222.

In some implementations, the encoder 210 and the decoder 220 may be located in the same or different devices, respectively. When they are located in different devices, the different devices may all include the context generator 230, and may further include the entropy model 250.

According to an example implementation of the present disclosure, the coding of the target image $x_t$ 202 is based on the reference image 240 thereof. The reference image 240 may include a decoded image $\hat{x}_{t-1}$ at time t−1 before t in the video segment. On the decoding side, the decoded image $\hat{x}_{t-1}$ may be directly obtained as the reference image 240. On the encoding side, the decoded image $\hat{x}_{t-1}$ generated by performing the corresponding operation on the decoding side may be taken as the reference image 240. In other implementations, other images that are considered to have temporal correlation with the target image $x_t$ 202 may be selected as the reference images 240. For example, the decoded images at one or more other time before or after t may be selected as the reference images.

The context generator 230 is configured to extract the contextual feature representation 232 (represented as $\overline{x}_t$) of the reference image $\hat{x}_{t-1}$ 240. Assuming that the reference image $\hat{x}_{t-1}$ 240 and the target image $x_t$ 202 have temporal correlation, the contextual feature representation $\overline{x}_t$ 232 may characterize the contextual information associated with the target image $x_t$ 202 in the feature domain.

In this document, "feature representation" is characterizing the corresponding feature information (contextual information here) in the form of a vector, and the vector may have a plurality of dimensions. "Feature representation" sometimes may be referred to as "vectorized representation", "feature vector", "feature" and so on. These terms are used interchangeably in this document.

In some implementations, the context generator 230 may use a machine learning model to extract the contextual feature representation $\overline{x}_t$ 232. Some example implementations of contextual feature extraction will be discussed in more detail with reference to FIG. 4 below.

In the encoding process, the contextual feature representation $\overline{x}_t$ 232 is provided to the encoder 210. The encoder 210 is configured to encode the target image $x_t$ 202 based on the contextual feature representation $\overline{x}_t$ 232. The contextual feature representation $\overline{x}_t$ 232 is provided as a condition of the encoded target image $x_t$ 202 to help encode better. The encoder 210 is configured to perform encoding on the target image $x_t$ 202 under the condition of a given contextual feature representation $\overline{x}_t$ 232, to obtain an encoded representation $y_t$. Such encoding is also referred to as conditional encoding, and the encoder 210 may be a context encoder. In this document, conditional coding means giving arbitrary information as a condition to help the encoding and decoding of the image.

Correspondingly, the contextual feature representation $\overline{x}_t$ 232 is provided to the decoder 220 during the decoding process. The decoder 220 is configured to obtain the decoded image 222 corresponding to the target image $x_t$ 202 by decoding based on the contextual feature representation $\overline{x}_t$ 232. The decoder 220 is configured to perform conditional decoding of the target image $x_t$ 202 given the contextual feature representation $\overline{x}_t$ 232. The decoding side also includes a context generator 230. In some implementations, the bitstream 214 is received on the decoding side, and the decoded image 222 is decoded from the bitstream 214 based on the contextual feature representation $\overline{x}_t$ 232.

Starting from the conventional residual-based coding solution, when it is expected to obtain certain conditions to guide the coding, a direct way might be taking the predicted image $\tilde{x}_t$ of the current target image $x_t$ as the condition. Such conditional coding may be represented as:

$$\hat{x}_t = f_{dec}(\lfloor f_{enc}(x_t \mid \tilde{x}_t) \rceil \mid \tilde{x}_t) \tag{2}$$

$$\text{where } \tilde{x}_t = f_{predict}(\hat{x}_{t-1}),$$

In the above Equation (2), $f_{enc}(x_t|\tilde{x}_t)$ represents the encoding of the target image $x_t$ under the condition of a given predicted image $\tilde{x}_t$, and $f_{dec}(\lfloor f_{enc}(x_t|\tilde{x}_t)\rceil\|\tilde{x}_t)$ represents the decoding of the encoded result under the condition of the given predicted image $\tilde{x}_t$. However, such a condition is still limited by a pixel domain of the image, where each pixel can only be characterized by limited channel dimensions (for example, values of three dimensions RGB). Such a condition will limit the characterization of contextual information.

In the implementation of the present disclosure, the richer and more relevant contextual information for encoding the target image is characterized by using a higher-dimensional contextual feature representation in the feature domain from the reference image $\hat{x}_{t-1}$ 240. In addition, because the feature representation has a capability of characterizing higher-dimensional information, different channels in the contextual feature representation 232 may extract different types of contextual information with a higher degree of freedom, including color information, texture information, high-frequency component information, object edge information and so on.

In some implementations, the context-based image coding may be represented as follows:

$$\hat{x}_t = f_{dec}(\lfloor f_{enc}(x_t \mid \overline{x}_t) \rceil \mid \overline{x}_t) \tag{3}$$

$$\text{where } \overline{x}_t = f_{context}(\hat{x}_{t-1})$$

In the above Equation (3), $f_{enc}(\cdot)$ represents an encoding process of the encoder 210, $f_{dec}(\cdot)$ represents a decoding process of the decoder 220, $f_{context}(\cdot)$ represents a processing operation of the context generator 230, and $\lfloor\cdot\rceil$ represents the quantization achieved by a rounding operation.

According to an example implementation of the present disclosure, there is provided a context-based image coding solution, especially machine learning-based contextual image coding. In the feature domain, the richer and more relevant contextual information for encoding the target image is characterized by using a higher-dimensional contextual feature representation. Through various contextual features extracted from the contextual feature representation, the context-based image coding can achieve higher reconstruction quality, especially for images with more high-frequency content and complex textures.

Figure 3:
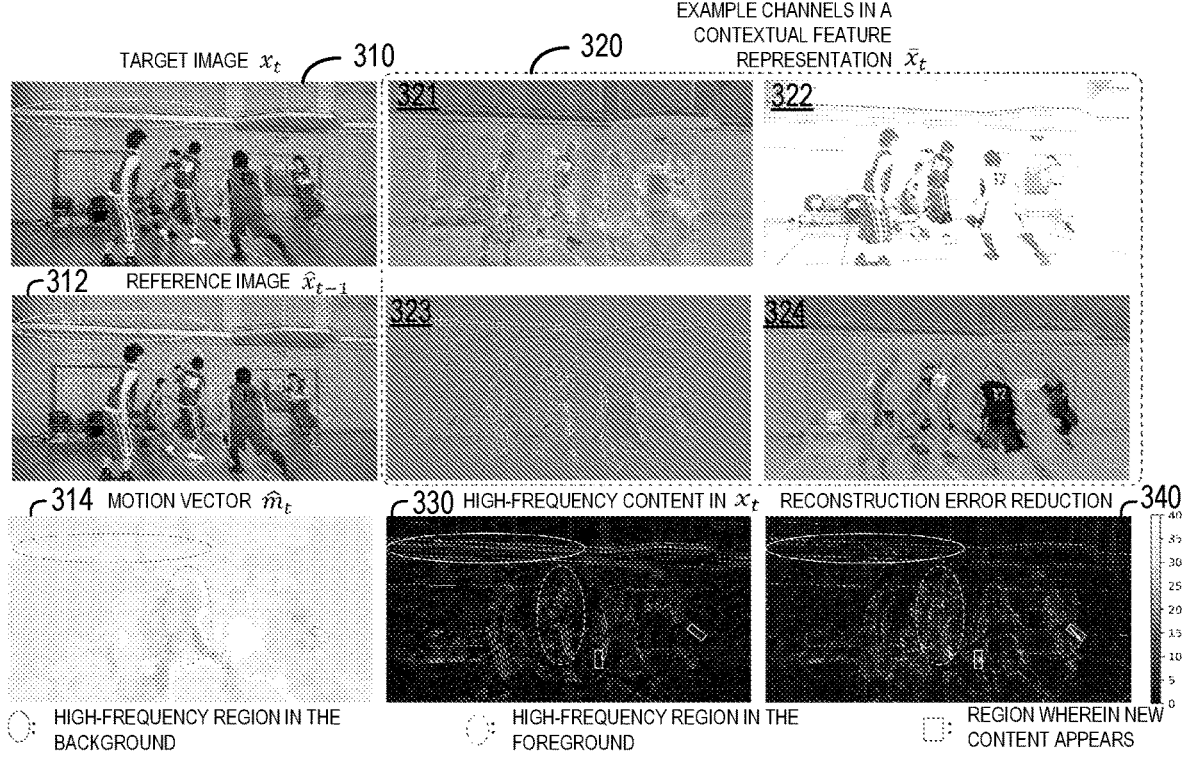
FIG. 3 illustrates an example of a capability of a contextual feature representation characterizing contextual information according to some implementations of the present disclosure.

FIG. 3 illustrates a capability of the contextual feature representation 232 extracted by the context generator 230 characterizing the contextual information. As shown in FIG. 3, a target image 310 and its reference image 312 are provided. A feature map 320 includes feature maps 321, 322, 323 and 324 of four different channels in the contextual feature representation extracted from the target image 310. These four channels have different emphasis.

The feature map 321 focuses on extracting motion information, because a basketball player in motion shown therein has a higher intensity, and corresponds to a high intensity region in a visual representation 314 of a motion vector $\hat{m}_t$ not between the target image 310 and the reference image 312. As compared with the visual representation 330 with the high-frequency content in the target image 310, it may be seen that the feature map 323 places more emphasis on the high-frequency content to characterize the feature information related to the high-frequency content. In contrast, the feature maps 322 and 324 focus more on color information, where the feature map 322 focuses on green, and the feature map 324 focuses more on red.

The reconstruction error reduction graph 340 in FIG. 3 represents an amount of reduction in reconstruction error that can be obtained by the context-based coding solution according to example implementations of the present disclosure as compared with the conventional residual-based coding solution. It can be seen from the reconstruction error reduction graph 340 that the context-based coding solution according to example implementations of the present disclosure can achieve significant error reduction, especially the error reduction in the high-frequency regions in the foreground and background. For many conventional codecs, such high-frequency regions are all considered difficult to compress.

In some implementations, the encoder 210 may be configured to perform conditional encoding using an encoding model. The contextual feature representation $\bar{x}_t$ 232 and the target image $x_t$ 202 are provided as an input to the encoding model so that the encoding model processes and outputs the encoded representation corresponding to the target image 202.

In some implementations, the decoder 220 may also be configured to perform conditional decoding using a decoding model. The contextual feature representation $\bar{x}_t$ 232 and the encoded representation corresponding to the target image $x_t$ 202, such as the quantization encoded representation $\hat{y}_t$, are provided as the input to the decoding model so that the decoding model processes and outputs the decoded image 222 corresponding to the target image 202.

The encoding model and the decoding model may be implemented based on various machine learning or deep learning techniques. For example, the encoding model and the decoding model may be based on a neural network (NN), where each model has a plurality of network layers. These network layers for example may include one or more convolutional layers, general normalization (GDN) layers (for encoding model), inverse GDN (IGND) (for decoding model), Resblock layers, etc. In the implementations of the present disclosure, the configuration of the encoding model and the decoding model is not limited.

By using machine learning technology, the encoding model may automatically learn the correlation between the target image $x_t$ 202 and the contextual feature representation $\bar{x}_t$ 232, and reduce the encoding of redundant information based on such correlation, instead of removing the redundancy by a fixed subtraction operation as in the conventional residual-based coding solution.

On the other hand, the encoding model may further adaptively learn how to use the contextual feature representation $\bar{x}_t$ 232. For example, due to the presence of the motion in the video, new content might always appear in an edge region of an object. In this case, since the residual-based coding solution always requires the residual to be encoded, for newly appearing content, the residual is very large and the inter-frame encoding performed via the subtraction operation might not be as efficient as the intra-frame encoding. On the contrary, the context-based coding according to implementations of the present disclosure can adaptively use the contextual feature representation as a condition. For newly appearing content, the encoding model may adaptively learn to perform intra-frame encoding, thereby significantly improving the compression efficiency. As shown in the reconstruction error reduction graph 340 in FIG. 3, the reconstruction error of the new content appearing in the target image 310 is significantly reduced. It can be seen from the above that the context-based coding according to implementations of the present disclosure can also encode new content caused by the motion very well, and can significantly reduce the reconstruction error.

In addition to being used for performing encoding and decoding on the target image 202 in the encoder 210 and the decoder 220, in some implementations, the contextual feature representation $\bar{x}_t$ 232 may further be used in the entropy model 250 to perform entropy encoding from the encoded representation generated by the target image 202 to obtain the bitstream 214, or to perform entropy decoding on the bitstream 214 to generate a corresponding quantized encoded representation for decoding by the decoder 220. Example processing regarding the entropy model 250 will be discussed hereunder in more detail with reference to FIG. 5.

Extraction of the Contextual Feature Representation

In some implementations, the machine learning model used by the context generator 230 may take the reference image $\hat{x}_{t-1}$ 240 as input, and extract the contextual feature representation $\bar{x}_t$ 232 from the reference image $\hat{x}_{t-1}$ 240.

In some implementations, considering that a video segment often contains various types of content, and might contain many complex motions, motion-related information may also be used to help extract better contextual feature representations $\bar{x}_t$ 232. For example, for a position in the target image $x_t$ 202, the same position in the reference image $\hat{x}_{t-1}$ 240 might have less correlation. In this case, the same position in the feature map of the contextual feature representation $\bar{x}_t$ 232 also has little correlation with that position in the target image $x_t$ 202, and the contextual information with less correlation possibly cannot promote the compression and encoding of the target image $x_t$ 202. Based on this, in some implementations, it is proposed to use motion-related information, such as motion vector (MV) information, to extract contextual feature representation $\bar{x}_t$ 232.

Figure 4:
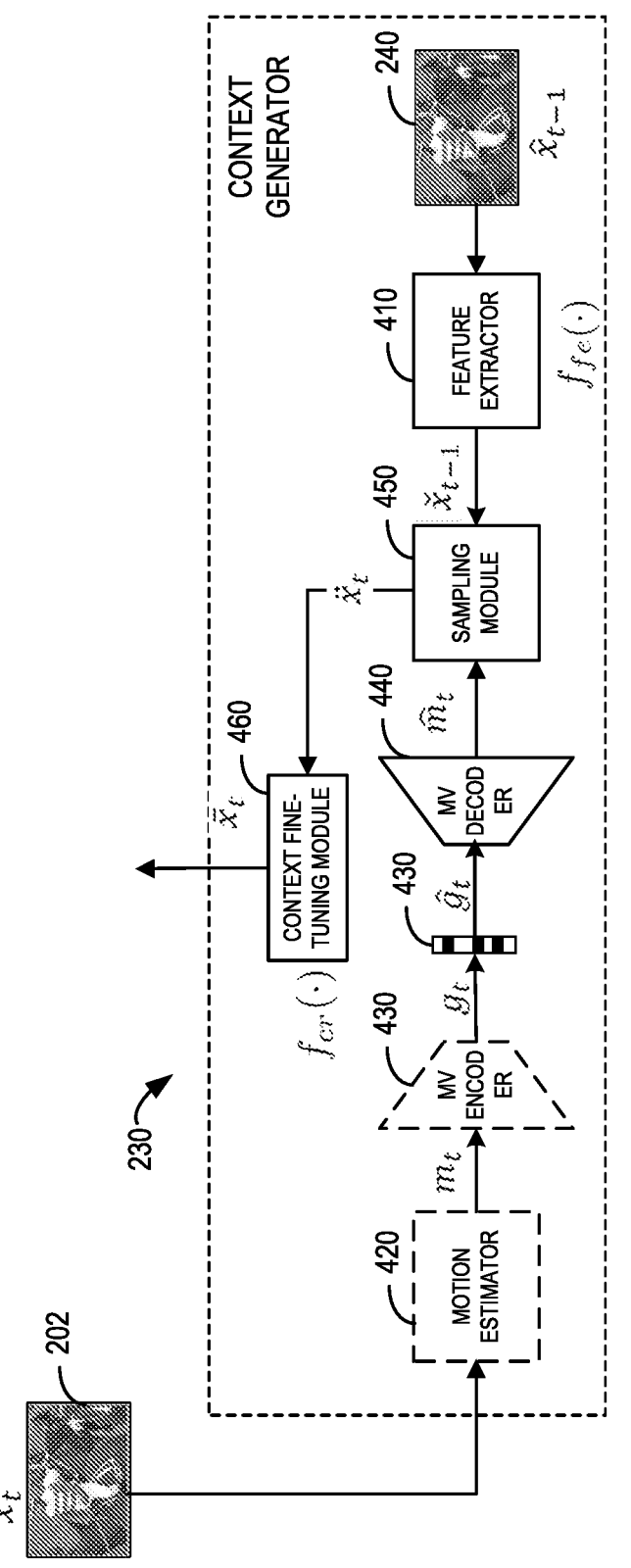
FIG. 4 illustrates a block diagram of an example structure of a context generator in the system of FIG. 2 according to some implementations of the present disclosure.

FIG. 4 illustrates a block diagram of an example structure of a context generator 230 in the system of FIG. 2 according to some implementations of the present disclosure. In the example implementation of FIG. 4, the context generator 230 includes a feature extractor 410 configured to extract an initial contextual feature representation $\check{x}_{t-1}$ from the reference image $\hat{x}_{t-1}$ 240. The feature extractor 410 may be implemented by a machine learning model to convert the reference image 240 from a pixel domain to a feature domain.

The context generator 230 further includes a component for determining motion vector information between the reference image $\bar{x}_{t-1}$ 240 and the target image $x_t$ 202. FIG. 4 shows that the context generator 230 includes a motion estimator 420, an MV encoder 430 and an MV decoder 440 to implement estimation of motion vector information.

The motion estimator 420 is configured to generate motion vector information $m_t$ between time t−1 and time t based on the target image $x_t$ 202. In some examples, the motion estimator 420 may use an optical flow estimation model to determine an optical flow between time t−1 and time t as the motion vector information $m_t$. The optical flow refers to an instantaneous velocity of a pixel motion of a moving object in a space on an observation imaging plane. Therefore, after the optical flow estimation model is trained, changes of pixels in an image sequence in a time domain and the correlation between adjacent images can be used to find a correspondence relationship between a previous time and the current time, thereby calculating the motion information of the object between the adjacent images. Any currently-existing or future-developed motion vector estimation technique may be used to determine the motion vector information $m_t$. The implementation of the present disclosure is not limited in this aspect.

The MV encoder 430 is configured to encode the motion vector information $m_t$ to obtain an encoded representation 432 (represented as $g_t$) of the motion vector information. Similar to the processing of the encoded representation of the target image $x_t$ 202, the encoded representation 432 may be entropy-encoded by the entropy model to obtain the bitstream 430. The bitstream corresponding to the motion vector information may be transmitted to the decoding terminal together with the bitstream of the target image $x_t$ 202. Therefore, on the decoding side, the motion estimator 420 and the MV encoder 430 do not exist. The MV decoder 440 is configured to generate a quantized encoded representation $\hat{g}_t$ for the bitstream 430 of motion vector information $m_t$, and decode the quantized encoded representation $\hat{g}_t$ to obtain decoded motion vector information $\hat{m}_t$. The MV encoder 430 and the MV decoder 440 may also be implemented based on a machine learning model.

The context generator 230 further includes a sampling module 450 configured to adjust the initial contextual feature representation $\check{x}_{t-1}$ extracted by the feature extractor 410 based on the decoded motion vector information $m_t$, so as to extract contextual information more relevant to the target image 202. In some implementations, the sampling module 450 is configured to convert the initial contextual feature representation $\check{x}_{t-1}$ through a warping operation to obtain an intermediate contextual feature representation $\ddot{x}_t$. The processing of the sampling module 450 may be represented as $\ddot{x}_t$=warp($\check{x}_{t-1}$, $m_t$) where warp ( ) represents the warping operation performed by the sampling module 450. The decoded motion vector information $\hat{m}_t$ may be used to guide interpolation sampling for respective element values in the initial contextual feature representation $\check{x}_{t-1}$.

The intermediate contextual feature representation $\ddot{x}_t$ may be considered as being capable of characterizing contextual information relatively roughly, because warping operations may introduce some spatial discontinuities. The context generator 230 may also include a context fine-tuning module 460, which is configured to generate a final contextual feature representation $\bar{x}_t$ 232 from the intermediate contextual feature representation $\ddot{x}_t$, where $\bar{x}_t$=$f_{cr}(\ddot{x}_t)$. The context fine-tuning module 460 may also use a machine learning model to implement fine-tuning of the feature representation. The machine learning model for example may include a plurality of network layers, such as one or more convolutional layers, Resblock layers, and so on. In some implementations, the context-based image coding may be represented as follows:

$$f_{context}(\hat{x}_{t-1}) = f_{cr}(\text{warp}(f_{fe}(\hat{x}_{t-1}), \hat{m}_t)) \qquad (4)$$

In the above Equation (4), $f_{fe}(\ )$ represents the feature extraction process of the feature extractor 410, warp ( ) represents the warping operation performed by the sampling module 450, and $\bar{f}_{cr}(\bullet)$ represents the context fine-tuning module 460.

The example implementations of extracting the contextual feature representation 232 based on the motion vector information is described above with reference to FIG. 4. It should be appreciated that other methods may also be employed, for example, various other types of machine learning models may be configured to extract the contextual feature representation from the reference image to facilitate the coding of the target image. The implementation of the present disclosure is not limited in this respect.

Example Implementation of the Entropy Model

As mentioned briefly above, in some implementations, the contextual feature representation at $\bar{x}_t$ 232 may further be used in the entropy model 250 to perform entropy encoding or entropy decoding on the slave image 202. The entropy model is a quantized encoding model commonly used in image coding. On the encoding side, the entropy model 250 can generate the bitstream 214 from the encoded representation $y_t$ output by the encoder 210. On the decoding side, the entropy model 250 can determine the quantized encoded representation $\hat{y}_t$ of the target image 202 from the bitstream 214 for further decoding by the decoder 220.

The entropy model mainly considers a cross entropy between an estimated probability distribution and a distribution of the quantized encoded representation $\hat{y}_t$, which is a lower limit value of the actual code rate. This may be represented as:

$$R(\hat{y}_t) \geq \mathbb{E}_{\hat{y}_t \sim q_{\hat{y}_t}}\left[-\log_2 p_{\hat{y}_t}(\hat{y}_t)\right] \qquad (5)$$

where $p_{\hat{y}_t}(\hat{y}_t)$ and $q_{\hat{y}_t}(\hat{y}_t)$ represent the estimated probability quality distribution and the actual probability quality function of the quantized encoded representation $\hat{y}_t$ respectively; $R(\hat{y}_t)$ represents the actual code rate, and $$\mathbb{E}_{\hat{y}_t \sim q_{\hat{y}_t}}$$

represents the cross entropy.

In fact, the arithmetic coding can almost encode the quantized encoded representation $\hat{y}_t$ at the code rate of the cross entropy. However, there is still a difference between the actual code rate $R(\hat{y}_t)$ and the cross entropy. Therefore, in some implementations of the present disclosure, the contextual feature representation $\bar{x}_t$ 232 is introduced to enable the entropy model 250 to more accurately estimate the probability distribution $p_{\hat{y}_t}(\hat{y}_t)$ of the latent code.

Figure 5:
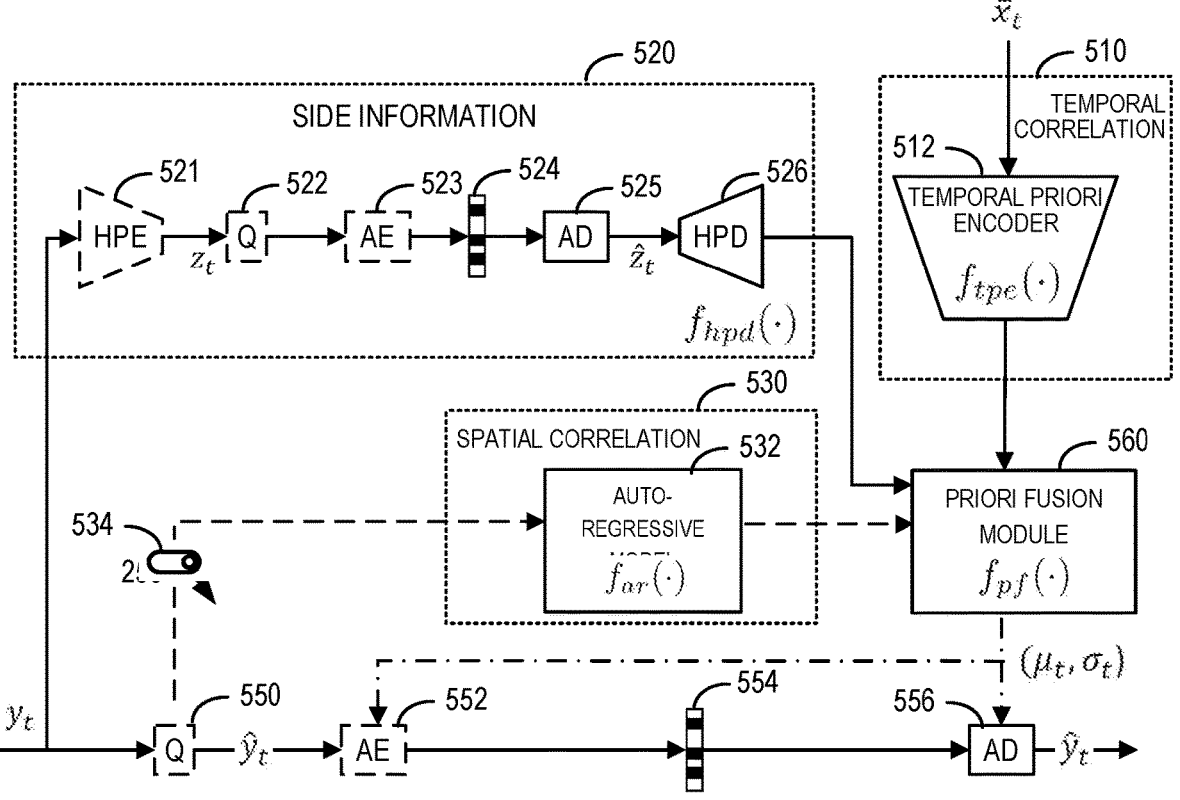
FIG. 5 illustrates a block diagram of an example structure of an entropy model in the system of FIG. 2 according to some implementations of the present disclosure.

FIG. 5 illustrates a block diagram of an example structure of an entropy model 250 in the system of FIG. 2 according to some implementations of the present disclosure. In FIG. 5, the entropy model 250 includes a temporal correlation portion 510, which is configured to determine temporal correlation information between the target image $x_t$ 202 and the reference image $\hat{x}_{t-1}$ 240 based on the contextual feature representation $\bar{x}_t$ 232. The temporal correlation portion 510 may use a temporal priori encoding model 512 to determine the temporal correlation information from the contextual feature representation $\bar{x}_t$ 232. The temporal correlation information can provide temporal prior information, so that the temporal correlation between the processed latent codes can be taken into account.

In addition to the temporal correlation portion 510, the entropy model 250 includes: a typical side information extraction portion 520 for extracting side information from the encoded representation $y_t$, and a spatial correlation portion 530 for extracting spatial correlation information from the encoded representation $y_t$. The side information can provide hierarchical prior information in the target image 202, and the spatial correlation information can provide spatial prior information. The side information extraction portion 520 and the spatial correlation portion 530 may be implemented by using modules for extracting the two types of information in the conventional entropy model. FIG. 5 only shows an example implementation regarding the two portions.

As shown in FIG. 5, the side information extraction portion 520 includes: a hyper prior encoder (HPE) 521 for encoding an encoded representation $y_t$ to obtain an intermediate encoded representation $z_t$; a quantization (Q) 522 for quantizing the intermediate encoded representation $z_t$ to obtain a quantized encoded representation $\hat{z}_t$; an arithmetic encoder (AE) 523 for quantizing the quantized encoded representation to obtain a bitstream 524 corresponding to the side information; an arithmetic decoder (AD) 525 for decoding the bitstream 524 corresponding to the side information to obtain the quantized encoded representation $\hat{z}_t$; and a hyper prior decoder (HPD) 526 for decoding the arithmetic decoded quantized encoded representation $\hat{z}_t$ to obtain the side information. The bitstream 524 corresponding to the side information may be transmitted to the decoding side.

The entropy model 250 further includes a quantization (Q) 550 for quantizing the encoded representation $y_t$ to obtain a quantized encoded representation $\hat{y}_t$. The quantized encoded representation $\hat{y}_t$ output by the quantization 550 is provided to the spatial correlation portion 530. The spatial correlation portion 530 may use an auto-regressive model 532 to perform acquisition of the spatial correlation information of the target image 202 from the quantized encoded representation $\hat{y}_t$.

In some implementations, the temporal correlation information, the side information and the spatial correlation information are provided to a priori fusion module 560. The priori fusion module 560 is configured to fuse the temporal correlation information, the side information and the spatial correlation information to determine a mean value $\mu_t$ and a variance $\sigma_t$ of the probability distribution at time t. The mean value $\mu_t$ and the variance $\sigma_t$ may be provided to AE 552. The AE 552 is configured to perform arithmetic encoding on the quantized encoded representation $\hat{y}_t$ output by the quantization 550 based on the mean value $\mu_t$ and the variance $\sigma_t$, so as to obtain a bitstream 554 corresponding to the target image 202. The arithmetic encoded representation 554 is provided to the AD 556 which is configured to decode the quantized encoded representation $\hat{t}_t$ from the bitstream 554 based on the mean value $\mu_t$ and the variance $\sigma_t$.

In some implementations, the HPE 521, the quantization 522 and AE 523 in the side information extraction portion 520, and the quantization 550 and AE 552 are only included on the encoding side, and may not be needed on the decoding side. The bitstream 524 of the side information extracted by the side information extraction portion 520 may be transmitted to the decoding side for use upon decoding. During decoding, the quantized encoded representation may be determined based on the bitstream 554 corresponding to the target image 202 through the AD 556. In this process, the priori fusion module 560 still provides information on mean value $\mu_t$ and the variance $\sigma_t$. The quantized encoded representation $\hat{y}_t$ is provided to the encoder 220 to generate a decoded image.

In some implementations, through the processing of the entropy model 250, the determination of $p_{\hat{y}_t}(\hat{y}_t)$ may be represented as follows:

$$p_{\hat{y}_t}(\hat{y}_t \mid \bar{x}_t, \hat{z}_t) = \prod \left( \mathcal{L}(\mu_{t,i}, \sigma_{t,i}^2) * \mathcal{U}\left(-\frac{1}{2}, \frac{1}{2}\right)\right)(\hat{y}_t, i) \qquad (6)$$

$$\text{where } \mu_{t,i}, \sigma_{t,i} = f_{pf}(f_{hpd}(\hat{z}_t), f_{ar}(\hat{y}_t, < i), f_{tpe}(\bar{x}_t))$$

In the above Equation (6), the index i represents a spatial position in the image, assuming that $p_{\hat{y}_t}(\hat{y}_t)$ follows the Laplace distribution. Certainly, it may also be assumed that $p_{\hat{y}_t}(\hat{y}_t)$ follows another distribution, such as Gaussian distribution, mixed Gaussian distribution, and so on. In the above Equation (6), $f_{hpd}(\bullet)$ represents the processing of the HPD 526; $f_{ar}(\bullet)$ represents the processing of the autoregressive model 532; $f_{tpe}(\bullet)$ represents the processing of the temporal priori encoding model 512, and $f_{pf}(\bullet)$ represents the processing of the priori fusion module 560.

It should be appreciated that what is given in FIG. 5 is an example of determining the side information and the temporal correlation information. In other examples, other techniques may also be used to determine the side information and the temporal correlation information. Alternatively or additionally, other information may also be determined, and used together with the temporal correlation information given by the contextual feature representation to perform entropy encoding or entropy decoding on the encoded representation.

Generally, the extraction of spatial correlation often takes a relatively long period of time. In some implementations, the spatial correlation portion 530 may also be omitted from the entropy model 250. For example, the spatial correlation portion 530 may be bypassed by a switch module 534. The priori fusion module 560 and subsequent modules generate the bitstream 214 based on the temporal correlation information and the side information. The Inventor discovers through many experiments that the omission of spatial correlation information has a very small impact on the reconstruction quality, but may bring about a large improvement in the processing efficiency.

Example Implementation of Model Training

In the above depictions, many components in the system 200 may be implemented by machine learning models, so it is necessary to determine parameters of these machine learning models through a training process. Various appropriate model training techniques may be employed to implement the training of the machine learning models in the system 200. In some implementations, a trained loss function may be configured based on a distortion of the decoded image and a bit rate overhead. For example, the loss function may be determined as follows:

$$L = \lambda \cdot D + R \qquad (7)$$

where the parameter λ may be a predetermined value for controlling a trade-off between the distortion D and the bit rate overhead R. In some examples, depending on different application requirements, the distortion degree D may be represented with a mean squared error (MSE) or a multi-scale structural similarity (MS-SSIM). In the training process, R may be determined as the cross entropy between the true probability distribution and the estimated probability distribution of the quantized encoded representation.

Example Performance Comparison

Figure 6:
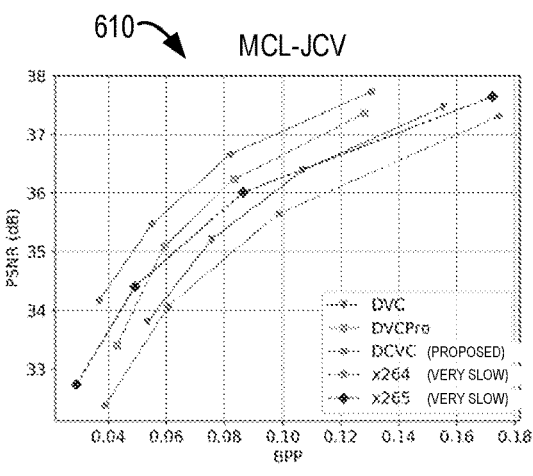
FIG. 6 illustrates a comparison between a context-based video coding solution according to some implementations of the present disclosure and a conventional video coding solution.
Figure 6:
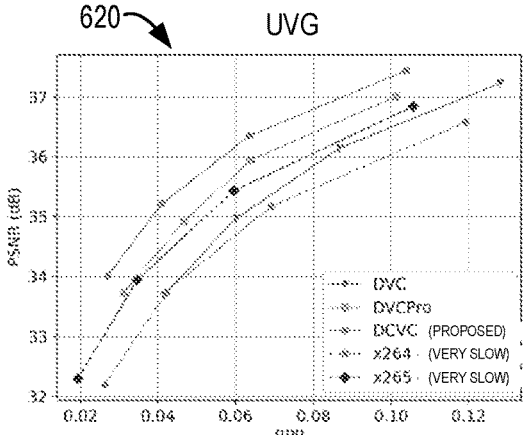
Figure 6:
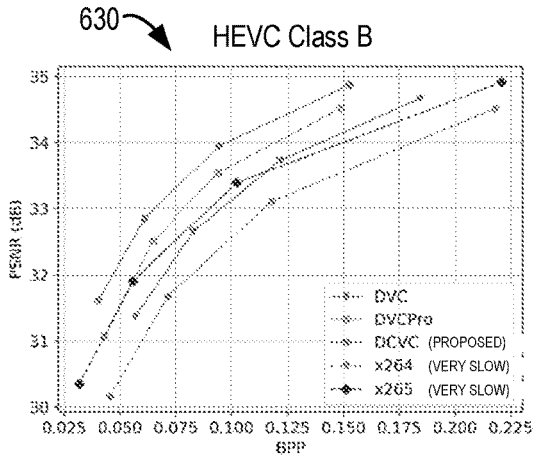
Figure 6:
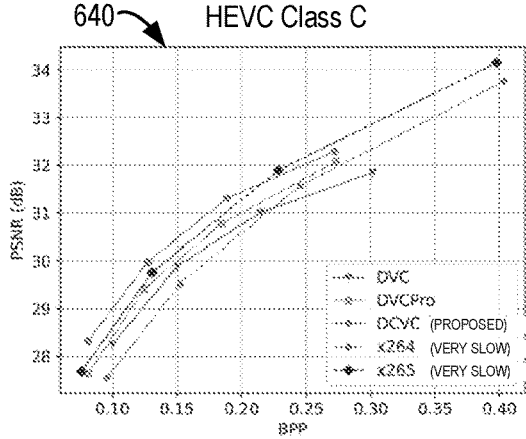
Figure 6:
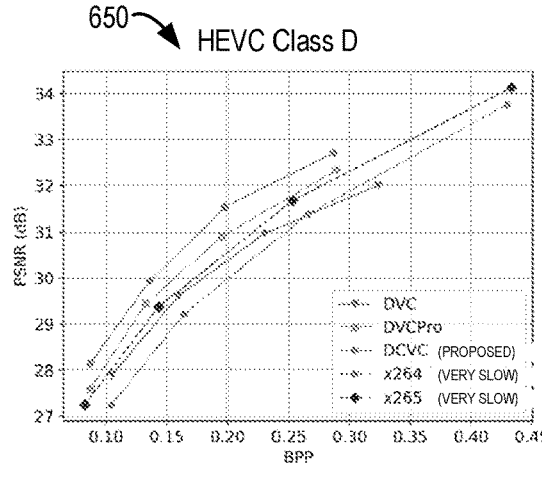
Figure 6:
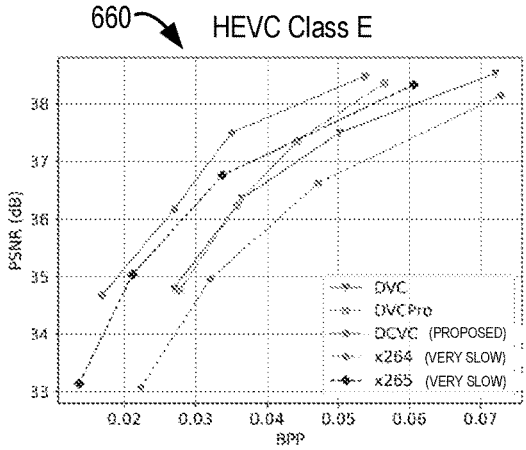

FIG. 6 illustrates the comparison between the context-based coding solution (represented as deep contextual video compression (DCVC)) according to the present disclosure and four conventional coding solutions from perspective of performance indices in two aspects: the reconstruction quality (represented by PSNR, where PSNR refers to a peak signal-to-noise ratio) and the bit rate overhead BPP (bits per pixel). The four conventional coding solutions are represented as DVC (deep video compression), DVCPro, x264 and x265 (with the "very slow" configuration level selected), respectively.

Graphs 610, 620, 630, 640, 650 and 660 show measurement of performance indices of five solutions on two video datasets MCL-JCV, UVG, HEVC ClassB, HEVC ClassC, HEVC ClassD and HEVC ClassE, respectively. It can be seen from these graphs that under the same BPP, the context-based coding solution DCVC according to the present disclosure can achieve higher reconstruction quality, namely, PSNR. Under the same PSNR, the context-based coding solution DCVC according to the present disclosure can achieve a lower BPP.

Example Processes

Figure 7:
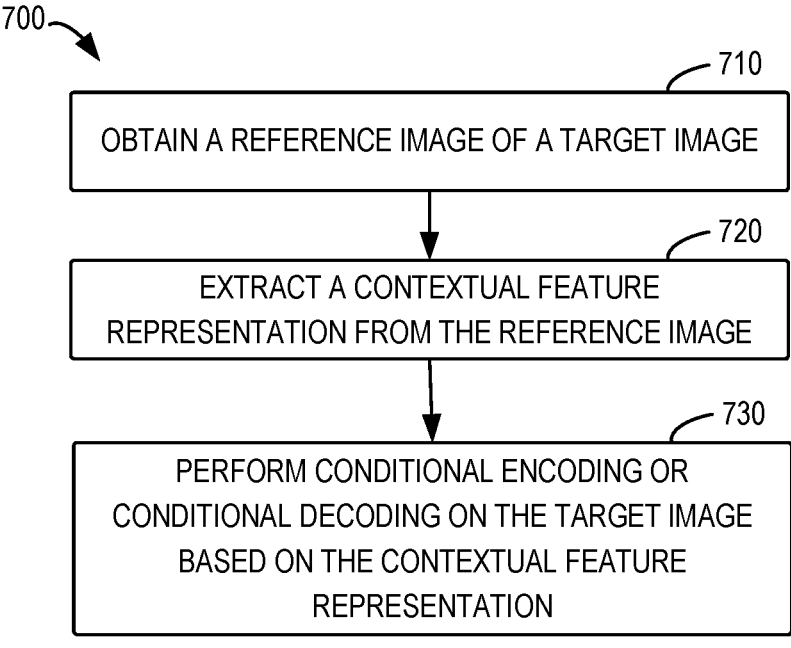
FIG. 7 illustrates a flowchart of a video coding process according to some implementations of the present disclosure.

FIG. 7 illustrates a flowchart of an image coding process 700 according to some implementations of the present disclosure. The process 700 may be implemented at the system 200 shown in FIG. 2.

At block 700, a reference image of a target image is obtained. At block 720, a contextual feature representation is extracted from the reference image. The contextual feature representation characterizes contextual information associated with the target image. At block 730, conditional encoding or conditional decoding is performed on the target image based on the contextual feature representation.

In some implementations, performing the conditional encoding on the target image comprises: generating an encoded representation of the target image by applying the contextual feature representation and the target image as an input to an encoding model, the encoding model being configured to perform the conditional encoding. In some implementations, decoding the target image comprises: generating a decoded image corresponding to the target image by applying the contextual feature representation and an encoded representation of the target image as an input to a decoding model, the decoding model being configured to perform the conditional decoding.

In some implementations, extracting the contextual feature representation from the reference image comprises: extracting an initial contextual feature representation from the reference image; determining motion vector information between the reference image and the target image; and adjusting the initial contextual feature representation based on the motion vector information, to obtain the contextual feature representation.

In some implementations, performing the conditional encoding or conditional decoding on the target image further comprises: determining temporal correlation information between the target image and the reference image based on the contextual feature representation; and performing entropy encoding or entropy decoding on the target image at least based on the temporal correlation information.

In some implementations, performing the entropy encoding or entropy decoding on the target image comprises: obtaining side information of the target image; and performing the entropy encoding or entropy decoding on the target image at least based on the temporal correlation information and the side information.

In some implementations, performing the entropy encoding or entropy decoding on the target image comprises: obtaining spatial correlation information of the target image from an encoded representation; and performing the entropy encoding or entropy decoding on the target image at least based on the temporal correlation information and the spatial correlation information. In some implementations, performing the entropy encoding comprises: obtaining an encoded representation of the target image, and generating a bitstream of the target image from an encoded representation of the target image at least based on the temporal correlation information. In some implementations, performing the entropy decoding comprises: obtaining a bitstream of the target image, determining an encoded representation of the target image from the bitstream at least based on the temporal correlation information, and determining a decoded image from the encoded representation of the target image.

Example Devices

Figure 8:
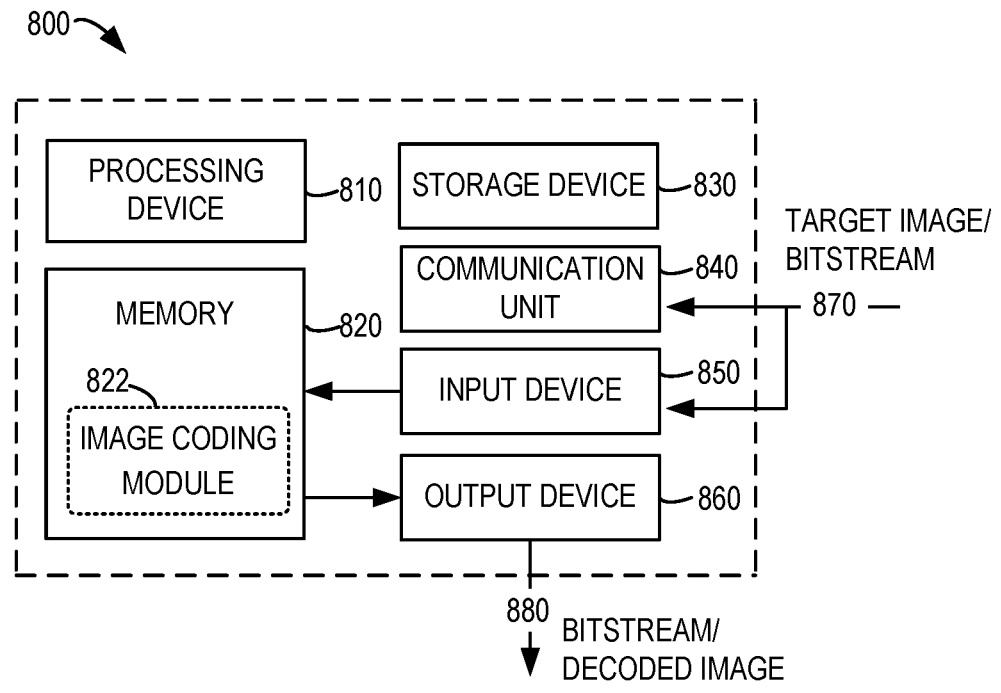
FIG. 8 illustrates a block diagram of a computing device capable of implementing a plurality of implementations of the present disclosure.

FIG. 8 illustrates a block diagram of a computing device 800 in which various implementations of the present disclosure may be implemented. It would be appreciated that the computing device 800 as shown in FIG. 8 is merely provided as an example, without suggesting any limitation to the functionalities and scope of implementations of the present disclosure. The computing device 800 may be used to implement an image encoding and/or image decoding process according to implementations of the present disclosure.

As shown in FIG. 8, the computing device 800 includes a computing device 800 in form of a general-purpose computing device. Components of the computing device 800 may include, but are not limited to, one or more processors or processing units 810, a memory 820, a storage device 830, one or more communication units 840, one or more input devices 850, and one or more output devices 860.

In some implementations, the computing device 800 may be implemented as any user terminal or server terminal with computing capability. The server terminal may be any server, large-scale computing device, and the like provided by a variety of service providers. The user terminal may, for example, be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device, or any combination thereof, including the accessories and peripherals of these devices, or any combination thereof. It is also anticipated that the computing device 800 can support any type of interface to a user (such as "wearable" circuitry and the like).

The processing unit 810 may be a physical or virtual processor and may execute various processes based on the programs stored in the memory 820. In a multi-processor system, a plurality of processing units execute computer-executable instructions in parallel so as to enhance parallel processing capability of the computing device 800. The processing unit 810 may also be referred to as a central processing unit (CPU), a microprocessor, a controller, or a microcontroller.

The computing device 800 usually includes various computer storage medium. Such a medium may be any available medium accessible by the computing device 800, including but not limited to, volatile and non-volatile medium, or detachable and non-detachable medium. The memory 820 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 820 may include a image coding module 822, which is configured to perform the functionalities of various implementations described herein. The image coding module 822 may be accessed and run by the processing unit 810 to implement the corresponding functions.

The storage device 830 may be any detachable or non-detachable medium and may include machine-readable medium that may be used for storing information and/or data and is accessible within the computing device 800. The computing device 800 may further include additional detachable/non-detachable, volatile/non-volatile memory medium. Although not shown in FIG. 8, there may be provided a disk drive for reading from or writing into a detachable and non-volatile disk, and an optical disk drive for reading from and writing into a detachable non-volatile optical disc. In such case, each drive may be connected to a bus (not shown) via one or more data medium interfaces.

The communication unit 840 implements communication with another computing device via the communication medium. In addition, the functions of components in the computing device 800 may be implemented by a single computing cluster or a plurality of computing machines that may communicate with each other via communication connections. Therefore, the computing device 800 may operate in a networked environment using a logic connection with one or more other servers, personal computers (PCs), or further general network nodes.

The input device 850 may be one or more of a variety of input devices, such as a mouse, keyboard, tracking ball, voice-input device, and the like. The output device 860 may include one or more of a variety of output devices, such as a display, loudspeaker, printer, and the like. By means of the communication unit 840, the computing device 800 may further communicate with one or more external devices (not shown) such as storage devices and display devices, one or more devices that enable the user to interact with the computing device 800, or any devices (such as a network card, a modem and the like) that enable the computing device 800 to communicate with one or more other computing devices, if required. Such communication may be performed via input/output (I/O) interfaces (not shown).

In some implementations, as an alternative of being integrated on a single device, some or all components of the computing device 800 may also be arranged in the form of cloud computing architecture. In the cloud computing architecture, these components may be provided remotely and work together to implement the functionalities described in the present disclosure. In some implementations, cloud computing provides computing, software, data access and storage service, which will not require end users to be aware of the physical locations or configurations of the systems or hardware provisioning these services. In various implementations, the cloud computing provides the services via a wide area network (such as Internet) using proper protocols. For example, a cloud computing provider provides applications over the wide area network, which may be accessed through a web browser or any other computing components. The software or components of the cloud computing architecture and corresponding data may be stored in a server at a remote position. The computing resources in the cloud computing environment may be aggregated at the location of a remote data center or they may be distributed. Cloud computing infrastructure may provide the services through a shared data center, though they behave as a single access point for the users. Therefore, the cloud computing infrastructure may be utilized to provide the components and functionalities described herein from a service provider at remote locations. Alternatively, they may be provided from a conventional server or may be installed directly or otherwise on a client device.

The computing device 800 may be used to implement the context-based image coding in various implementations of the present disclosure. The computing device 800, for example the memory 820 includes an image coding module 822. Upon implementing the image encoding, the image coding module 822 may be configured to perform the above functions regarding the image encoding. Upon image decoding, the image coding module 822 may be configured to perform the above functions regarding the image decoding.

The computing device 800 may receive an input 870 through the input device 850 or communication unit 840. Upon performing encoding, the input 870 includes a target image to be encoded. Upon performing decoding, the input 807 includes a bitstream to be decoded. The input 870 is provided to the image coding module 822 to perform an image coding operation. Upon performing encoding, the image coding module 822 generates a bitstream of the target image as an output 800. Upon performing decoding, the image coding module 822 generates a decoded image of the target image as the output 800. In some implementations, the output 800 may be output by the output device 860, or may be transmitted to other devices via the communication unit 840.

Example Implementations

Some example implementations of the present disclosure are listed below:

In an aspect, the present disclosure provides a computer-implemented method. The method comprises: obtaining a reference image of a target image; extracting a contextual feature representation from the reference image, the contextual feature representation characterizing contextual information associated with the target image; and performing conditional encoding or conditional decoding on the target image based on the contextual feature representation.

In some implementations, performing the conditional encoding on the target image comprises: generating an encoded representation of the target image by applying the contextual feature representation and the target image as an input to an encoding model, the encoding model being configured to perform the conditional encoding. In some implementations, performing the conditional decoding on the target image comprises: generating a decoded image corresponding to the target image by applying the contextual feature representation and an encoded representation of the target image as an input to a decoding model, the decoding model being configured to perform the conditional decoding.

In some implementations, extracting the contextual feature representation from the reference image comprises: extracting an initial contextual feature representation from the reference image; determining motion vector information between the reference image and the target image; and adjusting the initial contextual feature representation based on the motion vector information, to obtain the contextual feature representation.

In some implementations, performing the conditional encoding or conditional decoding on the target image further comprises: determining temporal correlation information between the target image and the reference image based on the contextual feature representation; and performing entropy encoding or entropy decoding on the target image at least based on the temporal correlation information.

In some implementations, performing the entropy encoding or entropy decoding on the target image comprises: obtaining side information of the target image; and performing the entropy encoding or entropy decoding on the target image at least based on the temporal correlation information and the side information.

In some implementations, performing the entropy encoding or entropy decoding on the target image comprises: obtaining spatial correlation information of the target image from an encoded representation; and performing the entropy encoding or entropy decoding on the target image at least based on the temporal correlation information and the spatial correlation information.

In some implementations, performing the entropy encoding comprises: obtaining an encoded representation of the target image, and generating a bitstream of the target image from an encoded representation of the target image at least based on the temporal correlation information. In some implementations, performing the entropy decoding comprises: obtaining a bitstream of the target image, determining an encoded representation of the target image from the bitstream at least based on the temporal correlation information, and determining a decoded image from the encoded representation of the target image.

In another aspect, the present disclosure provides an electronic device. The electronic device comprises: a processor; and a memory coupled to the processor and having instructions stored thereon, the instructions, when executed by the processor, causing the device to perform actions comprising: obtaining a reference image of a target image; extracting a contextual feature representation from the reference image, the contextual feature representation characterizing contextual information associated with the target image; and performing conditional encoding or conditional decoding on the target image based on the contextual feature representation.

In some implementations, performing the conditional encoding on the target image comprises: generating an encoded representation of the target image by applying the contextual feature representation and the target image as an input to an encoding model, the encoding model being configured to perform the conditional encoding. In some implementations, performing the conditional decoding on the target image comprises: generating a decoded image corresponding to the target image by applying the contextual feature representation and an encoded representation of the target image as an input to a decoding model, the decoding model being configured to perform the conditional decoding.

In some implementations, extracting the contextual feature representation from the reference image comprises: extracting an initial contextual feature representation from the reference image; determining motion vector information between the reference image and the target image; and adjusting the initial contextual feature representation based on the motion vector information, to obtain the contextual feature representation.

In some implementations, performing the conditional encoding or conditional decoding on the target image further comprises: determining temporal correlation information between the target image and the reference image based on the contextual feature representation; and performing entropy encoding or entropy decoding on the target image at least based on the temporal correlation information.

In some implementations, performing the entropy encoding or entropy decoding on the target image comprises: obtaining side information of the target image; and performing the entropy encoding or entropy decoding on the target image at least based on the temporal correlation information and the side information.

In some implementations, performing the entropy encoding or entropy decoding on the target image comprises: obtaining spatial correlation information of the target image from an encoded representation; and performing the entropy encoding or entropy decoding on the target image at least based on the temporal correlation information and the spatial correlation information.

In some implementations, performing the entropy encoding comprises: obtaining an encoded representation of the target image, and generating a bitstream of the target image from an encoded representation of the target image at least based on the temporal correlation information. In some implementations, performing the entropy decoding comprises: obtaining a bitstream of the target image, determining an encoded representation of the target image from the bitstream at least based on the temporal correlation information, and determining a decoded image based on the encoded representation of the target image.

In a further aspect, the present disclosure provides a computer program product being tangibly stored in a computer storage medium and comprising computer-executable instructions, the computer-executable instructions, when executed by a device, causing the device to perform actions comprising: obtaining a reference image of a target image; extracting a contextual feature representation from the reference image, the contextual feature representation characterizing contextual information associated with the target image; and performing conditional encoding or conditional decoding on the target image based on the contextual feature representation.

In some implementations, performing the conditional encoding on the target image comprises: generating an encoded representation of the target image by applying the contextual feature representation and the target image as an input to an encoding model, the encoding model being configured to perform the conditional encoding; in some implementations, performing the conditional decoding on the target image comprises: generating a decoded image corresponding to the target image by applying the contextual feature representation and an encoded representation of the target image as an input to a decoding model, the decoding model being configured to perform the conditional decoding.

In some implementations, extracting the contextual feature representation from the reference image comprises: extracting an initial contextual feature representation from the reference image; determining motion vector information between the reference image and the target image; and adjusting the initial contextual feature representation based on the motion vector information, to obtain the contextual feature representation.

In some implementations, performing the conditional encoding or conditional decoding on the target image further comprises: determining temporal correlation information between the target image and the reference image based on the contextual feature representation; and performing entropy encoding or entropy decoding on the target image at least based on the temporal correlation information.

In some implementations, performing the entropy encoding or entropy decoding on the target image comprises: obtaining side information of the target image; and performing the entropy encoding or entropy decoding on the target image at least based on the temporal correlation information and the side information.

In some implementations, performing the entropy encoding or entropy decoding on the target image comprises: obtaining spatial correlation information of the target image from an encoded representation; and performing the entropy encoding or entropy decoding on the target image at least based on the temporal correlation information and the spatial correlation information.

In some implementations, performing the entropy encoding comprises: obtaining an encoded representation of the target image, and generating a bitstream of the target image from an encoded representation of the target image at least based on the temporal correlation information. In some implementations, performing the entropy decoding comprises: obtaining a bitstream of the target image, determining an encoded representation of the target image from the bitstream at least based on the temporal correlation information, and determining a decoded image based on the encoded representation of the target image.

In a further aspect, the present disclosure provides a computer readable medium having computer-executable instructions stored thereon, the computer-executable instructions, when executed by a device, causing the device to perform the method in the above aspect.

The functionalities described herein can be performed, at least in part, by one or more hardware logic components. As an example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out the methods of the present disclosure may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of the present disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological actions, it is to be understood that the subject matter specified in the appended claims is not necessarily limited to the specific features or actions described above. Rather, the specific features and actions described above are disclosed as example forms of implementing the claims.

The invention claimed is:

1. A method for context-based image coding comprising:
obtaining a reference image of a target image;
extracting, using a machine learning model, an initial contextual feature representation from the reference image by converting the reference image from a pixel domain to a feature domain;
estimating motion vector information or optical flow between the reference image and the target image;
warping the initial contextual feature representation using the estimated motion vector information or optical flow to generate a warped feature tensor;
refining the warped feature tensor using a context-fine-tuning neural network to obtain a final contextual feature representation that characterizes contextual information associated with the target image; and
performing conditional encoding or conditional decoding on the target image based on the final contextual feature representation.

2. The method of claim 1,
wherein performing the conditional encoding on the target image comprises:
generating an encoded representation of the target image by applying the contextual feature representation and the target image as an input to an encoding model, the encoding model being configured to perform the conditional encoding; or
wherein performing the conditional decoding on the target image comprises:
generating a decoded image corresponding to the target image by applying the contextual feature representation and an encoded representation of the target image as an input to a decoding model, the decoding model being configured to perform the conditional decoding.

3. The method of claim 1, wherein extracting the contextual feature representation from the reference image comprises:

extracting an initial contextual feature representation from the reference image;

determining motion vector information between the reference image and the target image; and adjusting the initial contextual feature representation based on the motion vector information, to obtain the contextual feature representation.

4. The method of claim 1, wherein performing the conditional encoding or conditional decoding on the target image further comprises:

determining temporal correlation information between the target image and the reference image based on the contextual feature representation; and performing entropy encoding or entropy decoding on the target image at least based on the temporal correlation information.

5. The method of claim 4, wherein performing the entropy encoding or entropy decoding on the target image comprises:

obtaining side information of the target image; and performing the entropy encoding or entropy decoding on the target image at least based on the temporal correlation information and the side information.

6. The method of claim 4, wherein performing the entropy encoding or entropy decoding on the target image comprises:

obtaining spatial correlation information of the target image from an encoded representation; and performing the entropy encoding or entropy decoding on the target image at least based on the temporal correlation information and the spatial correlation information.

7. The method of claim 4, wherein performing the entropy encoding comprises:

obtaining an encoded representation of the target image, and generating a bitstream of the target image from an encoded representation of the target image at least based on the temporal correlation information, and wherein performing the entropy decoding comprises:

obtaining a bitstream of the target image, determining an encoded representation of the target image from the bitstream at least based on the temporal correlation information, and determining a decoded image from the encoded representation of the target image.

8. An electronic device for context-based image coding, comprising:

a processor; and a memory coupled to the processor and having instructions stored thereon, the instructions, when executed by the processor, causing the electronic device to perform actions comprising:

obtaining a reference image of a target image;

extracting, using a machine learning model, an initial contextual feature representation from the reference image by converting the reference image from a pixel domain to a feature domain;

estimating motion vector information or optical flow between the reference image and the target image;

warping the initial contextual feature representation using the estimated motion vector information or optical flow to generate a warped feature tensor;

refining the warped feature tensor using a context-fine-tuning neural network to obtain a final contextual feature representation that characterizes contextual information associated with the target image; and performing conditional encoding or conditional decoding on the target image based on the final contextual feature representation.

9. The electronic device of claim 8, wherein performing the conditional encoding on the target image comprises:

generating an encoded representation of the target image by applying the contextual feature representation and the target image as an input to an encoding model, the encoding model being configured to perform the conditional encoding; or wherein performing the conditional decoding on the target image comprises:

generating a decoded image corresponding to the target image by applying the contextual feature representation and an encoded representation of the target image as an input to a decoding model, the decoding model being configured to perform the conditional decoding.

10. The electronic device of claim 8, wherein extracting the contextual feature representation from the reference image comprises:

extracting an initial contextual feature representation from the reference image;

determining motion vector information between the reference image and the target image; and adjusting the initial contextual feature representation based on the motion vector information, to obtain the contextual feature representation.

11. The electronic device of claim 8, wherein performing the conditional encoding or conditional decoding on the target image further comprises:

determining temporal correlation information between the target image and the reference image based on the contextual feature representation; and performing entropy encoding or entropy decoding on the target image at least based on the temporal correlation information.

12. The electronic device of claim 11, wherein performing the entropy encoding or entropy decoding on the target image comprises:

obtaining side information of the target image; and performing the entropy encoding or entropy decoding on the target image at least based on the temporal correlation information and the side information.

13. The electronic device of claim 11, wherein performing the entropy encoding or entropy decoding on the target image comprises:

obtaining spatial correlation information of the target image from an encoded representation; and performing the entropy encoding or entropy decoding on the target image at least based on the temporal correlation information and the spatial correlation information.

14. The electronic device of claim 11, wherein performing the entropy encoding comprises:

obtaining an encoded representation of the target image, and generating a bitstream of the target image from an encoded representation of the target image at least based on the temporal correlation information, and wherein performing the entropy decoding comprises:

obtaining a bitstream of the target image, determining an encoded representation of the target image from the bitstream at least based on the temporal correlation information, and determining a decoded image based on the encoded representation of the target image.

15. At least one non-transitory machine-readable medium comprising instructions for context-based image coding that, when executed by at least one processor, cause the at least one processor to perform operations to:

obtain a reference image of a target image;

extract, using a machine learning model, an initial contextual feature representation from the reference image by converting the reference image from a pixel domain to a feature domain, the contextual feature representation characterizing contextual information associated with the target image; and estimate motion vector information or optical flow between the reference image and the target image;

warp the initial contextual feature representation using the estimated motion vector information or optical flow to generate a warped feature tensor;

refine the warped feature tensor using a context-fine-tuning neural network to obtain a final contextual feature representation that characterizes contextual information associated with the target image; and perform conditional encoding or conditional decoding on the target image based on the final contextual feature representation.

16. The at least one non-transitory machine-readable medium of claim 15, the instructions to perform the conditional encoding on the target image further comprising instructions to:

generate an encoded representation of the target image by applying the contextual feature representation and the target image as an input to an encoding model, the encoding model being configured to perform the conditional encoding; or the instructions to perform the conditional decoding on the target image further comprising instructions to:

generate a decoded image corresponding to the target image by applying the contextual feature representation and an encoded representation of the target image as an input to a decoding model, the decoding model being configured to perform the conditional decoding.

17. The at least one non-transitory machine-readable medium of claim 15, the instructions to extract the contextual feature representation from the reference image further comprising instructions to:

extract an initial contextual feature representation from the reference image;

determine motion vector information between the reference image and the target image; and adjust the initial contextual feature representation based on the motion vector information, to obtain the contextual feature representation.

18. The at least one non-transitory machine-readable medium of claim 15, the instructions to perform the conditional encoding or conditional decoding on the target image further comprising instructions to:

determine temporal correlation information between the target image and the reference image based on the contextual feature representation; and perform entropy encoding or entropy decoding on the target image at least based on the temporal correlation information.

19. The at least one non-transitory machine-readable medium of claim 18, the instructions to perform the entropy encoding or entropy decoding on the target image further comprising instructions to:

obtain side information of the target image; and perform the entropy encoding or entropy decoding on the target image at least based on the temporal correlation information and the side information.

20. The at least one non-transitory machine-readable medium of claim 18, the instructions to perform the entropy encoding or entropy decoding on the target image further comprising instructions to:

obtain spatial correlation information of the target image from an encoded representation; and perform the entropy encoding or entropy decoding on the target image at least based on the temporal correlation information and the spatial correlation information.

* * * * *